Patented Jan. 14, 1947

2,414,274

UNITED STATES PATENT OFFICE 2,414,274

FLEXIBLE OILPROOF ADHESIVE COMPOSITIONS

Otto Sass and Elmer A. Lemire, Los Angeles, Calif., assignors to The Patent and Licensing Corporation, New York, N. Y., a corporation of Massachusetts No Drawing. Application October 21, 1943, Serial No. 507,180

3 Claims. (Cl. 106—126)

This invention relates to adhesive compositions and is more particularly concerned with the provision of an adhesive suitable for the fabrication of paper containers for oils and greases.

The invention has for its principal object the provision of an oil and grease impervious adhesive composition capable of yielding films characterized by their combined qualities of toughness and pliability. One particular application of a composition possessing the aforementioned attributes is in commercial paper laminating operations wherein duplexed oilproof papers are prepared for fabrication into paper containers of petroleum hydrocarbon materials such as oil, asphalt paints and the like.

Stated broadly, the oilproof adhesive composition of the present invention comprises a mixture of a water-miscible organic binder of a strong adhesive nature, combined with selected flexibilizers and humectants. It has been found that by the use of a strongly adhesive substance possessing high body strength, such as animal or hide glue, mixed with appropriate quantities of certain flexibilizers and humectants, there may be provided an oilproof adhesive possessing the desired characteristics and attributes, as will be more fully discussed hereinafter.

In selecting the adhesive for the composition of the present invention, animal glue having a gel strength between 150 and 300 grams, preferably between 200 and 250, may be used as a suitable high body strength adhesive substance. We have found that glue having a materially lower or higher gel strength than the respective low and high limits of gel strength above indicated is not suitable for the purposes of this invention. On the one hand, lower gel strength glue, after being treated in accordance with the present invention, will not provide a film sufficiently immobile and non-sticky to permit a duplexed sheet laminated therewith to be handled in subsequent bag or box fabricating operations. On the other hand, higher gel strength glue necessitates the use of such a high proportion of water in preparing the adhesive composition that the solids content of the resultant laminating film will be insufficient to render the duplexed sheet oil impervious.

The preferred plasticizing or flexibilizing portion of the composition is composed of approximately equal parts of urea and a substantially non-crystallizable sugar syrup, such, for example, as glucose, corn syrup, or invert sugar syrup. While optimum characteristics in the final composition can best be attained by using approximately equal parts of the materials as indicated, considerable deviation from this ratio is possible without loss of the desired properties of pliability and cohesive strength.

In accordance with the invention, one or more of the polyhydric alcohols such as glycol, diethylene glycol, glycerol, or sorbitol may be used to replace a portion of the flexibilizing mixture in order to impart an enhanced softening effect to the finished, oilproof, duplex material, when such softening is necessary because of the nature of the component sheets, or because of the complexity of the fabricating process in which the duplexed sheet is to be utilized. Because of their peculiar tendency to retain moisture in a "dry" adhesive film which has reached a state of equilibrium, these substances are herein termed humectants.

The adhesive composition is prepared by heating the water portion of the composition to from 140–180° F., and dissolving the urea therein. Then the temperature is again raised to 140–180° F., and maintained within this range while the glue is added with agitation. The agitation is continued until the mixture is uniform and grain free. Heat applied from the time the glue is added preferably should be indirect, as by means of a steam or hot oil jacket, steam coils, etc. Nevertheless, the agitation of the mixture must be sufficiently vigorous to prevent local overheating of the glue. The substantially non-crystallizable sugar syrup is next added and agitation continued until a homogeneous composition results. Finally, additional substances, such as humectants or softeners, preservatives and the like, may be incorporated in the composition.

The amount of plasticizing mixture employed may vary somewhat, but in accordance with the invention the quantity employed is held below that which would render the finished composition liquid at normal atmospheric temperatures, since such a condition of the composition would not, when applied between two sheets of paper, provide a continuous, immobile film. Moreover, to compensate for irregularities in the surface of the paper and permit an adequate amount of the composition to permeate between the fibers of the paper in the process of laminating, a fairly heavy layer (of the order of 12 to 18 pounds per 1000 square feet) is required. With such a thick layer of the adhesive composition, it is necessary that the composition be immobile and sufficiently cohesive at normal atmospheric temperatures in order to be strong enough to hold the plies of paper together in the subsequent operations of fabricating bags or other containers therefrom. Accordingly, the plasticizing mixture is employed in amounts varying from about 100% to 150%, by weight, of the glue base.

The resultant composition is non-liquid at normal atmospheric temperatures. When cast in thin sheet form and permitted to attain a state of equilibrium with the atmosphere at a temperature between 70 and 80° F., and a relative humidity of 40 to 60%, it is a gelatinous, pliable, extensible, elastic solid, with a quality of toughness or cohesiveness that can be measured in terms of tensile strength.

In the following examples there are set forth several illustrative embodiments of the invention, the figures representing parts by weight. It is to be understood, however, that the invention is not limited thereto.

*Formula 1*

| | |
|---|---|
| Animal glue (gel strength 150–300 grams) | 40 |
| Urea | 30 |
| Corn syrup | 30 |
| Water | 40 |

*Formula 2*

| | |
|---|---|
| Animal glue (gel strength 150–300 grams) | 40 |
| Urea | 30 |
| Invert sugar | 30 |
| Water | 40 |

*Formula 3*

| | |
|---|---|
| Animal glue (gel strength 150–300 grams) | 40 |
| Urea | 25 |
| Corn syrup | 25 |
| Water | 40 |
| Glycerine | 10 |

In conection with the foregoing formulae, it might be pointed out that the combination of approximately equal parts of urea and the substantially non-crystallizable sugar syrup with the specified type of glue, in the proportion indicated, produces in a film of the resultant adhesive composition a combination of desired characteristics which cannot otherwise be obtained by substituting for the mixture of the urea and sugar syrup an equivalent amount of either one of these ingredients. Stated more specifically, if 60 parts urea is used with the 40 parts glue in place of the combined 30 parts urea and 30 parts sugar syrup, the final composition will be liquid at normal atmospheric temperatures with the result that a film of the composition lacks the immobility essential for practical use in a paper duplexing operation. In another example, if 60 parts of say corn syrup is used with the 40 parts glue in place of the plasticizing mixture of 30 parts urea and 30 parts corn syrup, the film of the resultant composition will not remain sufficiently pliable under handling conditions involving flexing, bending etc. to be of any use in the practice of the present invention. Thus, it is evident that by using both ingredients in the plasticizing mixture, there is obtained a composition that possesses a high viscosity on the order of a gelatine, i. e., a non-liquid state, at normal atmospheric temperatures, and retains its flexibility indefinitely when filmed out to adhesively unite two plies of paper.

In general, these ingredients of the plasticizing mixture may be employed in amounts such as to provide a composition within the following range of proportions:

| | Per cent |
|---|---|
| Animal glue | 25–35 |
| Urea | 15–25 |
| Substantially non-crystallizable sugar syrup | 15–25 |
| Water | 45–15 |

In order to bring out more clearly the practical significance of the present oil impervious adhesive possessing the combined properties of pliabiltiy and toughness, one practical application of the composition will be described in detail. In the production of laminated paper, for example, the flexible glue, after being heated to 120–160° F., may be applied between two sheets of paper, say kraft paper, using any standard high speed paper laminating machine. The adhesive material may be applied at the rate of approximately 12 to 18 pounds per 1000 square feet of paper surface, in order to provide a comparatively thick yet relatively immobile film, which has sufficient body toughness to withstand the pressure applied to the sheets in order to force the material into the voids between the fibers on and near the surfaces of the sheets. The pressure is applied to the sheets immediately after the adhesive has been interposed therebetween and while the adhesive film is still warm and fluid. By such pressure any discontinuities in the adhesive layer, due to irregularities in the surface of the paper, are eliminated, while, at the same time, some of the adhesive is forced into the voids between the fibers and completely coats the fibers on and near the surfaces with which the adhesive layer is in contact. It is to be noted, in this connection, that the oil and grease impervious adhesive composition of the present invention is thus capable of withstanding the application of the aforesaid laminating pressure without being reduced to a film thickness inadequate to accomplish practical oil and grease proofness of the laminated sheet.

The thus laminated sheet may be wound into rolls for shipment or use without any necessity for passing the same over dryers. The flexible adhesive film in the duplex sheet, however, retains a relatively small percentage of moisture upon reaching the state of equilibrium, by reason of the presence therein of the humectants.

The laminated sheet, as above described, may then be fabricated into a bag or other container for hydrocarbon oils, greases and the like. It may also serve as the inner liner or membrane in the fabrication of a multi-wall bag or container suitable for holding oils and greases. For example, in the fabrication of a multi-wall kraft paper bag, the laminated sheet may be used as the inner liner of a three-ply container wall, the other plies consisting of two sheets of kraft paper of a suitable weight, such as 50 pound kraft. This form of container is particularly suitable for use as a five-gallon container intended for shipping liquids, such as asphalt cut-backs and asphalt paints.

In the use of the bags fabricated from the laminated paper hereinabove described, the bag may be placed in a fiberboard box, the bag filled with the liquid to be shipped, both the bag and the box being then sealed, as by stapling, sewing or taping, for storage and shipment.

While the present adhesive composition has been described as being particularly practical in the preparation of an oilproof duplex sheet comprising two sheets of kraft paper, the composition may also be applied with equal facility in laminating a sheet of kraft paper to a sheet of oil resistant paper, such as parchment. In this latter instance, the oil-proofness of the adhesive layer is reinforced by that of the parchment or other oil resistant paper, and the duplex sheet thus produced may be fabricated into a bag or other container for very light, penetrating oils, such as castor oil, raw linseed oil, solvents, and the like.

The oilproof, duplex sheet formed by laminating sheets of paper with the oil and grease impervious adhesive material of the present invention can be readily flexed, folded or otherwise handled in the fabrication of the containers in the same manner as any ordinary single ply sheet, as the adhesive film is immobile and possesses sufficient cohesive strength to withstand the stresses imposed during such fabrication, without rupturing or otherwise yielding. Additionally, the adhesive film is sufficiently tough and flexible for that purpose and will retain these properties in use for an indefinite period of time.

We claim:

1. An oil and grease-proof adhesive composition comprising animal glue possessing a gel test strength ranging from 150 to 300 grams, a plasticizing mixture comprising urea and a substantially non-crystallizable sugar syrup in approximately equal proportions, and water, said plasticizing mixture being present in an amount equal to approximately 100% to 150%, by weight of the glue, said composition being adapted to unite two sheets of paper together and to provide therein a permanent barrier to the passage of oil and grease.

2. A flexible oil and grease-proof adhesive composition comprising approximately 30% animal glue possessing a gel test strength ranging from 150 to 300 grams, approximately 20% urea, approximately 20% of a substantially non-crystallizable sugar syrup and approximately 30% water, all by weight of the total composition, said composition being non-liquid at normal atmospheric temperatures, and being adapted to unite two sheets of paper together and to provide therein a permanent barrier to the passage of oil and grease.

3. An adhesive composition adapted for laminating paper and providing therein a permanent barrier to the passage of oil and grease, said composition being non-liquid at normal atmospheric temperatures and comprising:

| | Per cent |
|---|---|
| Animal glue, gel strength 150 to 300 grams | 25–35 |
| Urea | 15–25 |
| Substantially non-crystallizable sugar syrup | 15–25 |
| Water | 45–15 |

OTTO SASS.
ELMER A. LEMIRE.